(12) United States Patent
McKenna

(10) Patent No.: US 9,200,189 B2
(45) Date of Patent: Dec. 1, 2015

(54) REFRIGERANT GAS COMPOSITION

(71) Applicant: Eco D'Gas AS, Sortland (NO)

(72) Inventor: Charles P. McKenna, Las Palmas (ES)

(73) Assignee: ECO D'GAS AS, Sortland (NO)

( * ) Notice: Subject to any disclaimer, the term of this patent is extended or adjusted under 35 U.S.C. 154(b) by 0 days.

(21) Appl. No.: 14/400,063

(22) PCT Filed: May 8, 2013

(86) PCT No.: PCT/NO2013/050083
§ 371 (c)(1),
(2) Date: Nov. 10, 2014

(87) PCT Pub. No.: WO2013/169118
PCT Pub. Date: Nov. 14, 2013

(65) Prior Publication Data
US 2015/0144833 A1    May 28, 2015

Related U.S. Application Data

(60) Provisional application No. 61/645,697, filed on May 11, 2012.

(51) Int. Cl.
*C09K 5/04* (2006.01)
*F25B 1/00* (2006.01)
*F25B 30/00* (2006.01)

(52) U.S. Cl.
CPC ............... *C09K 5/045* (2013.01); *F25B 30/00* (2013.01); *C09K 2205/22* (2013.01); *C09K 2205/40* (2013.01)

(58) Field of Classification Search
CPC .............. C09K 5/04; C09K 5/045; F25B 1/00
USPC ............................................... 252/67; 62/467
See application file for complete search history.

(56) References Cited

U.S. PATENT DOCUMENTS

| | | | |
|---|---|---|---|
| 5,185,094 A * | 2/1993 | Shiflett | 252/67 |
| 5,370,811 A | 12/1994 | Yoshida et al. | |
| 5,643,492 A * | 7/1997 | Shiflett | 252/67 |
| 5,722,256 A | 3/1998 | Shiflett | |
| 6,449,964 B1 * | 9/2002 | Cho et al. | 62/114 |
| 6,508,950 B1 * | 1/2003 | Lim et al. | 252/67 |
| 6,526,764 B1 | 3/2003 | Singh et al. | |
| 6,672,084 B2 * | 1/2004 | Cho et al. | 62/114 |
| 6,783,691 B1 * | 8/2004 | Bivens et al. | 252/67 |
| 2010/0101245 A1 * | 4/2010 | Bivens et al. | 62/77 |
| 2012/0096877 A1 * | 4/2012 | Yana Motta et al. | 62/79 |
| 2013/0096218 A1 * | 4/2013 | Rached et al. | 521/170 |

FOREIGN PATENT DOCUMENTS

| | | |
|---|---|---|
| EP | 0 742 274 | 11/1996 |
| EP | 811670 A1 * | 12/1997 |
| WO | WO 2011153117 A1 * | 12/2011 |
| WO | WO 2015083834 A1 * | 6/2015 |

OTHER PUBLICATIONS

International Search Report issued Jul. 23, 2013 in International (PCT) Application No. PCT/NO2013/050083.

* cited by examiner

*Primary Examiner* — Douglas McGinty
(74) *Attorney, Agent, or Firm* — Wenderoth, Lind & Ponack, L.L.P.

(57) ABSTRACT

Present invention relates to a refrigerant composition comprising tetrafluorethane, difluoromethane and pentafluoroethane for use in heating and cooling applications, especially for inverter air-conditioners/heat pumps.

6 Claims, No Drawings

REFRIGERANT GAS COMPOSITION

TECHNICAL FIELD

Present invention relates to a refrigerant composition for use in heating and cooling applications, especially for inverter air-conditioners/heat pumps.

BACKGROUND ART

An air conditioner (often referred to as air con, AC or A/C), is an apparatus designed to change the air temperature and humidity within an area used for cooling and sometimes heating depending on the air properties at a given time. The cooling is typically done using a simple refrigeration cycle. Previously, air conditioning units generally used R22 refrigerant. R22 is a single hydro-chlorofluorocarbon (HCFC) compound. R22 has been phased out in developed countries due to the compound's ozone depletion potential (ODP) and high global warming potential (GWP). The refrigerant mixture R410A was developed as a replacement to R22. R410A is a mixture of difluoromethane ($CH_2F_2$, called R32) and pentafluoroethane $CHF_2CF_3$, called R-125).

R410A was developed as an environmentally friendly gas due to pressure outside the industry to reduce global warming (GWP). One of its disadvantages is that it works at 75% higher pressure than the gas it has replaced, namely R22.

It is an object with the present invention to provide a new refrigerant composition which is more environmental friendly than R410A and works at lower pressure, and thus, is more energy efficient.

SUMMARY OF INVENTION

Present invention provides a refrigerant gas composition consisting of a mixture of tetrafluorethane (R134 A), difluoromethane (R32) and pentafluoroethane (R125) The composition comprises from 90 to 97.5 wt % tetrafluorethane and from 2.5 to 10 wt % of a mixture of difluoromethane and pentafluoroethane.

In an embodiment the composition comprises from 94-96 wt % of tetrafluorethane, from 2-3 wt % of difluoromethane and from 2-3 wt % of pentafluoroethane.

This gas composition will serve as an environmentally friendly alternative to the conventional R410A which is an approximately 50/50% mixture of difluoromethane R32 and pentafluoroethane R125. Up to 50-60% reductions in power consumption can be achieved.

DETAILED DESCRIPTION OF THE INVENTION

R134A is 1,1,1,2-tetrafluoroethane which is primarily used as a "high-temperature" refrigerant for domestic refrigeration and automobile air conditioners. R134A replaces R12 (dichlorodifluoromethane) which is also known as Freon 12. R 134A works at low vapour pressures which limit the refrigeration capacity of these compounds alone. Low vapour pressure is related to the cooling units expansion valves CV.

The inventors have surprisingly found that a mixture of difluoromethane and pentafluoroethane in an amount of 2.5 to 10 wt % added to tetrafluorethane exhibited excellent properties used in an air conditioner or heat pump. Any mixture proportion between the two gases difluoromethane and pentafluoroethane may be possible. One preferred mixture comprises from 40 to 60 wt % difluoromethane and from 60 to 40 wt % pentafluoroethane. Another preferred mixture comprises from 45 to 55 wt % difluoromethane and from 55 to 45 wt % pentafluoroethane.

In an experiment, when around 2.5 wt % of difluoromethane and around 2.5 wt % of pentafluoroethane were mixed with around 95 wt % tetrafluorethane the pressure increased to 2.5-3 bars which is suitable for heat pumps and air conditioners. This pressure is sufficient to obtain a good cooling/heating effect at the same time as energy is saved due to the low pressure. By increasing the content of difluoromethane and pentafluoroethane above a total content of 7.5 wt %, the pressure increases dramatically and with more than 10% there are no energy savings. If the total content of difluoromethane and pentafluoroethane is less than 2.5 wt % the gas composition is not suitable for heat pumps and air conditioners.

The gas composition can be used in all inverter compressors. It may also be used in ordinary on/off compressors, although the energy savings (around 20%) are not as big as for the inverter compressors (up to 50%).

Another advantage with the gas composition of the invention is that there will be less abrasion on the compressor, because of the lower operating pressure.

Still another advantage is that there is less leakage of gas because of the lower operating pressure.

The mean average performance will be dependent on machine and manufacturers of the gas.

A composition having the most savings in power consumption and lower pressure for longevity of maintenance and parts was found with a gas composition of 2.5 wt % of difluoromethane, 2.5 wt % of pentafluoroethane and 95 wt % tetrafluorethane. Savings can be made to a lesser degree with a composition comprising of up to 10 wt % of a mixture of difluoromethane and pentafluoroethane and 90 wt % tetrafluorethane.

The basic components are readily available from existing manufacturers. The gas composition according to the invention provides exceptional performance and cost savings well in excess up to of 50% of existing inverter compressors (DC) available on the market today. The optimal mixture can be used as a drop in for existing inverter compressors DC.

The gas composition of the invention is more ozone friendly than the existing alternative. The global warming potential value (GWP) of the gas composition of the invention is around 1300, which is much lower than the GWP of R410 A which is around 1975.

EXPERIMENTAL

Comparative test between R-410A and the gas composition according to the invention.

Measurements were performed on an air condition apparatus from Gree Electronic. The tested gas composition comprised 2.5 wt % of difluoromethane, 2.5 wt % of pentafluoroethane and around 95 wt % tetrafluorethane.

Below average data are registered during a 15 minutes run.

The measurements were made on two different days, and thus, there are some differences on some of the parameters such as the outdoor temperature.

TABLE 1

Power measurements of the tested gas composition versus R-410 A

| Measurement area | R-410 A | Gas composition (according to the invention) |
|---|---|---|
| Consumed electrical power (measured in amp) | 3.7 | 1.9 |
| Incoming air temperature to evaporator (ambient temperature) | 24.2 | 25.3 |
| Outgoing air temperature to evaporator (average) | 17.0 | 17.6 |
| Incoming air temperature to condenser (outdoor temperature) | 26.7 | 29.3 |
| Outgoing air temperature to condenser (average) | 32.2 | 33.7 |
| Air speed through evaporator | 3.3 | 4.1 |
| Air speed through condenser | 4.9 | 5.7 |
| Relative air humidity inside | 78.3 | 78.0 |
| Pressure/gas amount (bar) | 9.5 | 3.5 |

In addition a simple test of the heat effect of the inventive gas composition was performed. It was heated to about 40 degrees out, from about 23 degrees inside. Outside temperature was about the same as cooling. Energy consumption was 1.4 amp at a pressure of 11 bars.

CONCLUSION

By use of the inventive refrigerant composition in air conditioners/heat pumps the power is maintained or improved with less pressure and energy consumption compared with use of the refrigerant R410 A.

The invention claimed is:
1. A refrigerant composition consisting of a mixture of
    94 to 96 wt % of 1,1,1,2-tetrafluorethane,
    2 to 3 wt % of difluoromethane, and
    2 to 3 wt % of pentafluoroethane.
2. The refrigerant composition of claim 1, wherein the mixture of difluoromethane and pentafluoroethane consists of from 40 to 60 wt % difluoromethane and from 60 to 40 wt % pentafluoroethane.
3. An air conditioner comprising the refrigerant composition according to claim 1.
4. An air conditioner comprising the refrigerant composition according to claim 2.
5. A heat pump comprising the refrigerant composition according to claim 1.
6. A heat pump comprising the refrigerant composition according to claim 2.

* * * * *